UNITED STATES PATENT OFFICE 2,525,834

PROCESS OF TONER MANUFACTURE

Alfred F. Schmutzler, Teaneck, N. J., and Donald F. Othmer, Coudersport, Pa.

No Drawing. Application February 25, 1947, Serial No. 730,754

17 Claims. (Cl. 260—336)

This invention relates to toners, a type of pigment resulting from the reaction between a basic dye and a toner-forming polybasic acid.

The principal operation in the manufacture of toners is their precipitation. The dye and the polybasic acid are dissolved in suitable solvents, usually water. It is assumed that both reagents form colloidal solutions. When the two colloids are mixed, they mutually precipitate each other, with the formation of an insoluble toner, which seems to be the salt of the dyestuff and the polybasic acid. Because of the colloidal nature of the dye, a great tendency exists for some of it to be "laked," i. e. absorbed on the precipitate.

The conception of basic dyes forming toners with the polybasic acids of tungsten and molybdenum is based upon the formation of insoluble salts of phosphotungstic acid and phosphomolybdic acid with pyridine and ammonia, respectively. Accordingly, it is assumed that the basic group in a direct basic dye takes the place of pyridine or ammonia, with the formation of the toner.

Besides phosphotungstic acid and phosphomolybdic acid, there are other polybasic acids, in which phosphorus is substituted by aluminum, boron, chromium, iron, silicon, and vanadium. These acids are usually referred to as the polyacids of the heavy metals, and they are capable of forming toners with direct basic dyes. Toners can also be formed with organic polybasic acids, such as gallic acid or tannic acid. It was estimated that the toners of the poly-acids of the heavy metals are about 100 times more resistant to light than the corresponding tannic acid toners. The poly-acids are supposed to act as inhibitors in the bleaching of the colors due to photochemical oxidation.

The lightfastness of the toners is effected to some extent by the type of the poly-acid; the maximum fastness can be obtained by precipitating the dyestuff on a mixture of phosphotungstic acid and phosphomolybdic acid, referred to as phosphotungsticmolybdic acid. An after-treatment, such as boiling or autoclaving further improves the lightfastness of the toner, but in many instances decreases the color strength and impairs its brilliancy.

When the phosphotungstic acid and phosphomolybdic acid toners of the dye Rhodamine B receive an after-treatment by boiling or autoclaving, the yield increases slightly and the lightfastness is improved. These advantages are accompanied by the following disadvantages:

(1) There is a change in the hue toward a much bluer and less pleasing cerise red.

(2) There is a loss in color strength and color value of about 25%, while the additional yield amounts to about 5%.

It was assumed that the decrease in color strength is caused by a reduction reaction, which eliminates the chromophore groups in the dyestuff. This could be due to some impurities in commercial dyestuffs or some other source. However, it seems inconsequential as to whether high purity raw materials would prevent the loss in color strength and the changing of the hue, as the manufacture of toners with specially purified materials would be unsound economically. Furthermore, the cause of the disadvantages has just been assumed and has not been definitely determined.

It has been found that the lightfastness of the Rhodamine B toners can be improved by boiling or autoclaving without loss of color value and without a change of hue to a bluer and duller cerise red, by a simultaneous oxidation and precipitation process, which consists in adding an oxidizing agent, such as sodium dichromate, to the solution containing the poly-acid of the heavy metal or the solution containing the reagents necessary for the formation of the alkaline salts of the poly-acid, and mixing this solution, commonly called the fixing solution, with the dye solution. The procedure may slightly be varied by adding the oxidizing agent to the dye solution prior to the addition of the fixing solution, though with Rhodamine B and sodium dichromate a slight turbidity results in the dye solution and the resulting toner is weaker.

Some oxidizing agents are better than others, though improvements in color strength can be shown with all of them. Very good results are obtainable with chromates and dichromates, as apparently trivalent chromium combines with the carboxyl group of Rhodamine B with the formation of a chromium-Rhodamine B salt, to which the poly-acids add by virtue of the amino groups of the Rhodamine B dyestuff. The toners precipitated in the presence of dichromic acid can be boiled any length of time after their precipitation and the results are a slight increase in yield and greatly improved lightfastness over the toner which has not been boiled, though there is no change in hue to a bluer and duller cerise red and no loss in color value. The oxidizing agent seems to enhance the brightness during the after-treatment of this type of toner, while without the oxidizing agent the expected loss in color value and change in hue to a bluer and duller cerise red would take place. The amount of sodium dichromate is limited though not critical; good results are obtainable with additions of one to two grams of sodium dichromate dihydrate for every ten grams of Rhodamine B. With a large excess of dichromate, the toners become yellower, weaker and less lightfast.

Similar improvements in lightfastness, without the usual change in hue or diminution of brightness of the resulting pigment, are possible when pigment toners are made with the following dyestuffs: cyanol extra (which contains two sulfonic acid groups and a hydroxyl group in the molecule of the triphenylmethane dye), Chrome green (which contains one carboxyl group in the molecule of the triphenylmethane dye), Red Coralline (which contains a hydroxyl group in the molecule of the triphenylmethane dye), Muscarine chloride (which contains a hydroxyl group in the molecule of the oxazine dye), Helvetia Green (also called Acid Green, which contains a sulfonic acid group in the molecule of the triphenylmethane dye). The metal of the oxidizing agents, added in the form of the chromates, dichromates, vanadates, permanganates or the like, conveniently with the fixing solution, is apparently reduced to a lower valency, in which state it has the tendency to combine with the reactive group of the dyestuff. Simultaneously, the basic groups of the complex dyestuffs react with the polybasic acids of the heavy metals. The excess amount of oxidizing agent seems to prevent the formation of the leuco compound during boiling or autoclaving of the toners.

It is the object of this invention to prepare more lightfast toners without unduly sacrificing color strength and without substantially changing the hue of the pigment.

The method of practicing this invention is more specifically illustrated by reference to the following examples, in which the parts are by weight:

Example 1

10 parts Rhodamine B extra are dissolved in a solution of 4 parts glacial acetic acid and 34 parts technical hydrochloric acid 20° Bé., in 6,000 parts water, at 50 to 70° C. This solution is stirred and the following fixing solution is added: 2 parts sodium dichromate dihydrate, 23 parts sodium tungstate dihydrate, and 3.4 parts disodium phosphate dodecahydrate, dissolved in 280 parts water. The addition is preferably done gradually in about ½ hour, while the dye solution is stirred at 50 to 70°, then the resulting pigment slurry is boiled for ½ hour or longer. After filtering, washing and drying, the resulting dry pigment has at least the same strength, slightly lighter shade and the same brilliancy as a pigment prepared without sodium dichromate in the fixing solution and without an after-treatment at the boiling point of its striking solution, but it has a greatly improved lightfastness, which is lacking by the latter. If the latter, without sodium dichromate, in the fixing solution, would have been boiled, a similar improvement in lightfastness would have been obtained, but its strength would have been decreased by about 25%, its hue would have become bluer, and its brilliancy would have been dulled.

Example 2

10 parts Rhodamine B extra are dissolved in a solution of 4 parts glacial acetic acid and 34 parts technical hydrochloric acid 20° Bé., in 6,000 parts water, at 50 to 70° C. This solution is stirred, and the following fixing solution is gradually added in about ½ hour: 3.4 parts disodium phosphate dodecahydrate, 15 parts sodium tungstate dihydrate, 5 parts sodium molybdate anhydrous, and 2 parts sodium dichromate dihydrate in 280 parts water. After the addition is completed, the resulting pigment slurry is boiled for ½ hour or longer. The pigment is recovered by filtering the slurry, washing the filter cake, and by drying the wet pigment. It has a resistance to fading by sunlight similar to that of a toner, prepared without the addition of sodium dichromate to the fixing solution; it is about 25% stronger and more brilliant and has not changed its pleasing cerise hue to the bluer and duller shade of the latter, during the after-treatment. It is much more lightfast than a toner, prepared without the addition of sodium dichromate to the fixing solution and without boiling; it has at least the same strength and brilliancy of the latter.

Example 3

10 parts Rhodamine B extra are dissolved in a solution of 4 parts glacial acetic acid and 34 parts technical hydrochloric acid 20° Bé., in 6,000 parts water, at 50 to 70° C. This solution is stirred, and the following fixing solution is gradually added in about ½ hour: 15 parts anhydrous sodium molybdate, 3½ parts disodium phosphate dodecahydrate, 2 parts sodium dichromate dihydrate, in 280 parts water. After the addition is completed, the resulting pigment slurry is boiled for ½ hour or longer. The pigment is recovered by filtering the slurry, washing the filter cake, and drying the wet pigment. It has a resistance to fading similar to that of a toner, prepared without the addition of sodium dichromate to the fixing solution; it is about 25% stronger and more brilliant and has not changed its pleasing cerise hue to a bluer and duller shade of the latter. It is much more lightfast than a toner, prepared without the addition of sodium dichromate to the fixing solution and without boiling; it has at least the same strength and brilliancy of the latter.

Example 4

10 parts Rhodamine B extra are dissolved in a solution of 4 parts glacial acetic acid and 34 parts technical hydrochloric acid 20° Bé., in 6,000 parts water, at 50 to 70° C. This solution is stirred, and the following fixing solution is gradually added in about ½ hour: 15 parts sodium tungstate dihydrate, 5 parts anhydrous sodium molybdate, 1¾ parts anhydrous sodium metasilicate, 2 parts sodium dichromate dihydrate, dissolved in 600 parts water. After the addition is completed, the resulting pigment slurry is boiled for ½ hour or longer. The pigment is recovered by filtering the slurry, washing the filter cake and drying the wet pigment. It is more light-resistant than a toner prepared without boiling, and it is stronger and it has a greater brilliancy than a boiled toner prepared without the addition of sodium dichromate to the fixing solution.

Example 5

10 parts Rhodamine B extra are dissolved in a solution of 4 parts glacial acetic acid and 34 parts technical hydrochloric acid 20° Bé., in 6000 parts water, at 50 to 70° C. This solution is stirred, and the following fixing solution is gradually added in about ½ hour: 15 parts anhydrous sodium tungstate dihydrate, 5 parts anhydrous sodium molybdate, 2 parts borax (sodium tetraborate decahydrate), 2 parts sodium dichromate dihydrate, in 600 parts water. After the addition is completed, the resulting pigment slurry is boiled for 1 hour or longer. The pigment is recovered by filtering the slurry, washing the filter cake, and drying the wet pigment. The product is more lightfast than a toner prepared without boiling, and it is stronger and has more brilliancy than a boiled toner prepared without the addition of sodium dichromate to the fixing solution.

*Example 6*

10 parts Rhodamine B extra are dissolved in a solution of 4 parts glacial acetic acid and 34 parts technical hydrochloric acid 20° Bé., in 6000 parts water, at 50 to 70° C. This solution is stirred, and the following fixing solution is gradually added in about ½ hour: 15 parts sodium tungstate dihydrate, 5 parts anhydrous sodium molybdate, 1 part sodium aluminate, 2 parts sodium dichromate dihydrate, in 600 parts water. After the addition is completed, the resulting pigment slurry is boiled for 1 hour or longer. The pigment is recovered by filtering the slurry, washing the filter cake and drying the wet pigment. It is more lightfast than a toner prepared without boiling, and it is stronger and has more brilliancy than a boiled toner prepared without the addition of sodium dichromate to the fixing solution.

*Example 7*

10 parts Rhodamine B extra are dissolved in a solution of 4 parts glacial acetic acid and 34 parts technical hydrochloric acid 20° Bé. in 6000 parts water, at 50 to 70° C. This solution is stirred, and the following fixing solution is gradually added in about ½ hour: 15 parts sodium tungstate dihydrate, 5 parts anhydrous sodium molybdate, 3½ parts disodium phosphate dodecahydrate, 1 part sodium dichromate dihydrate, in 280 parts water. After the addition is completed, the resulting pigment slurry is boiled for ½ hour or longer. The pigment is recovered by filtering the slurry, washing the filter cake and drying the wet pigment. It is slightly bluer than the pigment of Example 2, but it is just as lightfast.

*Example 8*

10 parts Rhodamine B extra are dissolved in a solution of 4 parts glacial acetic acid and 30 parts technical hydrochloric acid 20° Bé. in 6000 parts water, at 50 to 70° C. This solution is stirred, and the following fixing solution is gradually added in about ½ hour: 15 parts sodium tungstate dihydrate, 5 parts anhydrous sodium molybdate, 3.4 parts disodium phosphate dodecahydrate, 4 parts sodium dichromate dihydrate, in 300 parts water. After the addition is completed, the resulting pigment slurry is boiled for ½ hour or longer. The pigment is recovered by filtering the slurry, washing the filter cake and drying the wet pigment. It is slightly yellower, slightly weaker and not quite as fast to light as the pigment prepared by Example 2. It has the advantage of exhibiting less darkening of its full strength prints upon exposure to sunlight.

*Example 9*

10 parts Rhodamine B extra are dissolved in a solution of 4 parts glacial acetic acid and 27 parts technical hydrochloric acid 20° Bé. in 6000 parts water, at 50 to 70° C. This solution is stirred, and the following fixing solution is gradually added in about ½ hour: 15 parts sodium tungstate dihydrate, 5 parts anhydrous sodium molybdate, 3.4 parts disodium phosphate dodecahydrate, ¾ part potassium permanganate, in 270 parts water. After the addition is completed, the resulting pigment slurry is boiled for ½ hour or longer. The pigment is recovered by filtering the slurry, washing the filter cake and drying the wet pigment. It is more lightfast than a toner prepared without boiling; and it is stronger than a boiled toner prepared without the addition of potassium permanganate to the fixing solution.

*Example 10*

10 parts Rhodamine B extra are dissolved in a solution of 4 parts glacial acetic acid and 30 parts technical hydrochloric acid 20° Bé. in 6000 parts water, at 50 to 70° C. This solution is stirred, and the following fixing solution is gradually added in about ½ hour: 15 parts sodium tungstate dihydrate, 5 parts anhydrous sodium molybdate, 3.4 parts disodium phosphate dodecahydrate, 1.0 part ammonium vanadate (metavanadate), in 300 parts water. After the addition is completed, the resulting pigment slurry is boiled for ½ hour or longer. The pigment is recovered by filtering the slurry, washing the filter cake and drying the wet pigment. It is more lightfast than a toner prepared without boiling, and it is stronger and more brilliant than a boiled toner prepared without the addition of ammonium vanadate.

*Example 11*

10 parts Rhodamine B extra are dissolved in a solution of 4 parts glacial acetic acid and 26 parts technical hydrochloric acid 20° Bé. in 6000 parts water, at 50 to 70° C. This solution is stirred, and 2¼ parts chromic nitrate monohydrate in 300 parts water, is added simultaneously with the following fixing solution in about ½ hour: 15 parts sodium tungstate dihydrate, 5 parts anhydrous sodium molybdate, 3.4 parts disodium phosphate dodecahydrate, in 280 parts water. After the additions are completed, the resulting pigment slurry is boiled for ½ hour or longer. The pigment is recovered by filtering the slurry, washing the filter cake and drying the wet pigment. It is more lightfast than a toner prepared without boiling, and it is stronger than a boiled toner prepared without the addition of chromic nitrate.

*Example 12*

10 parts Rhodamine B extra are dissolved in a solution of 3 parts glacial acetic acid and 26 parts technical hydrochloric acid 20° Bé. in 6000 parts water, at 50 to 70° C. This solution is stirred, and 3 parts cerous nitrate hexahydrate in 300 parts water, is added simultaneously with the following fixing solution in about ½ hour: 15 parts sodium tungstate dihydrate, 5 parts anhydrous sodium molybdate, 3.4 parts disodium phosphate dodecahydrate, ½ part sodium chlorate, in 280 parts water. After the addition is completed, the resulting pigment slurry is boiled for ½ hour or longer. The pigment is recovered by filtering the slurry, washing the filter cake and drying the wet pigment. It is more lightfast than a toner prepared without boiling, and it is stronger than a boiled toner without the addition of cerous nitrate and sodium chlorate.

*Example 13*

10 parts Rhodamine G are dissolved in a solution of 4 parts glacial acetic acid and 28 parts technical hydrochloric acid 20° Bé. in 6000 parts water, at 50 to 70° C. This solution is stirred, and the following fixing solution is gradually added in about ½ hour: 17½ parts sodium tungstate dihydrate, 5 parts anhydrous sodium molybdate, 1¼ parts sodium dichromate dihydrate, 4 parts disodium phosphate dodecahydrate, in 290 parts water. After the addition is completed, the resulting pigment slurry is boiled for ½ hour or longer. The pigment is recovered by filtering the slurry, washing the filter cake and drying the wet pigment. It is more lightfast than a toner prepared without boiling, and it is stronger than a boiled toner prepared without the addition of sodium dichromate with the fixing solution.

Example 14

10 parts Rhodamine S (B) are dissolved in a solution of 4 parts glacial acetic acid and 28 parts technical hydrochloric acid 20° Bé. in 6000 parts water, at 50 to 70° C. This solution is stirred, and the following fixing solution is gradually added in about ½ hour: 20 parts sodium tungstate dihydrate, 6½ parts anhydrous sodium molybdate, 1¼ parts sodium dichromate dihydrate, 4½ parts disodium phosphate dodecahydrate, in 320 parts water. After the addition is completed, the resulting pigment slurry is stirred for 3 hours at 85° C. The pigment is recovered by filtering the slurry, washing the filter cake and drying the wet pigment. It is more lightfast than a toner prepared without an after-treatment at 85° C., and it is stronger than an after-treated toner prepared without the addition of sodium dichromate with the fixing solution.

Example 15

10 parts Red Coralline are dissolved in a solution of 4 parts glacial acetic acid and 28 parts technical hydrochloric acid 20° Bé. in 6000 parts water, at 60° C. This solution is stirred, and the following fixing solution is gradually added in about ½ hour: 20 parts sodium tungstate dihydrate, 6½ parts anhydrous sodium molybdate, 1½ parts sodium dichromate dihydrate, 4½ parts disodium phosphate dodecahydrate, in 320 parts water. After the addition is completed, the resulting pigment slurry is boiled for ½ hour or longer. The pigment is recovered by filtering the slurry, washing the filter cake and drying the wet pigment. It is more lightfast than a toner prepared without boiling, and it is stronger than a boiled toner prepared without the addition of sodium dichromate to the fixing solution.

Example 16

10 parts Helvetia Green (also called "Acid Green") are dissolved in a solution of 4 parts glacial acetic acid and 28 parts technical hydrochloric acid 20° Bé. in 6000 parts water, at 60° C. This solution is stirred, and the following fixing solution is gradually added in about ½ hour: 20 parts sodium tungstate dihydrate, 6½ parts anhydrous sodium molybdate, 1¼ parts sodium dichromate dihydrate, 4½ parts disodium phosphate dodecahydrate, in 320 parts water. After the addition is completed, the resulting pigment slurry is boiled for ½ hour or longer. The pigment is recovered by filtering the slurry, washing the filter cake and drying the wet pigment. It is more lightfast than a toner prepared without boiling, and it is stronger than a boiled toner prepared without the addition of sodium dichromate with the fixing solution.

It has been demonstrated that basic dyes, containing acidic groups in their molecules, can be made to combine with polyvalent metals during the formation of the toners, resulting in pigments with improved qualities. The reaction between a salt of a metal and the acid group of a dye may be described as "metallizing" the dyestuff. It is known as chromium dyeing; wool may be mordanted with a chromic compound, and during subsequent dyeing with a dye containing acid groups, such as carboxyl, hydroxyl or sulfonic acid radicals, the metal salt formation of the dye with the chromium compound takes place.

Upon the addition of a metallizing compound, such as chromium chloride, to a clear dye solution, a turbidity results, and a subsequent toner formation with the turbid dye solution yields a pigment with a decreased color strength or color value based upon its yield. The same observation can be made by adding a dichromate or a vanadate to a Rhodamine B solution prior to the precipitation with a poly-acid of a heavy metal or an organic poly-acid, such as gallic or tannic acid. However, by the simultaneous addition of the metallizing compound and the reagents required for the formation of the toner-forming poly-acids, the color strength of the pigment or the color value of the total yield is substantially equal to that of the dye-stuff-poly-acid toner. The after-treatment above 70° C. imparts improved lightfastness to the metallized-dyestuff toner in about the same ratio as for the dyestuff-poly-acid toner, though the presence of an oxidizing agent in the striking solution during the after-treatment substantially diminishes or completely obviates the loss in color strength of the pigment or the color value, based upon the amount of dyestuff, as occurs with a dyestuff-poly-acid toner during boiling, in the absence of an oxidizing agent. If the dyestuff-poly-acid toner were boiled in an oxidizing striking solution, its lightfastness would be inferior to that of the metallized dyestuff-poly-acid toner boiled in the presence of an oxidizing agent.

As many apparently different embodiments of this invention may be made without departing from the spirit and scope thereof, it is to be understood that this invention is not limited to the specific embodiments thereof as defined in the following claims.

What is claimed is:

1. In a process for the manufacture of dyestuff toners wherein an acidic solution of a basic direct dyestuff having an acidic group and a basic group is precipitated with a solution of a polybasic acid of a heavy metal by reaction with said basic group, and the toner precipitate is subsequently heated to improve the light fastness thereof, that improvement comprising the addition prior to precipitation, as an oxidizing agent, an aqueous solution of an inorganic salt containing a heavy metal to one of said solutions, said heavy metal forming a complex with said acid group of the dyestuff, whereby deleterious effects of the heating step are avoided.

2. In a process for the manufacture of dyestuff toners wherein an acidic solution of a basic direct dyestuff having an acidic group and a basic group is precipitated with a solution of a polybasic acid of a heavy metal by reaction with said basic group, and the toner precipitate is subsequently heated to improve the light fastness thereof, that improvement comprising the addition prior to precipitation, as an oxidizing agent, an aqueous solution of an inorganic salt containing a heavy metal to said solution of a polybasic acid, said heavy metal forming a complex with said acid group of the dyestuff, whereby deleterious effects of the heating step are avoided.

3. The process set forth in claim 2 wherein said oxidizing agent is a compound containing chromium.

4. The process set forth in claim 2 wherein said oxidizing agent is a compound containing vanadium.

5. The process set forth in claim 2 wherein said oxidizing agent is a compound containing manganese.

6. The process set forth in claim 2 wherein said oxidizing agent is a compound containing cerium.

7. The process set forth in claim 2 wherein said oxidizing agent is sodium dichromate.

8. In a process for the manufacture of dyestuff toners wherein an acidic solution of a basic direct dyestuff having an acidic group and a basic group is precipitated with a solution of a polybasic acid of a heavy metal by reaction with said basic group, and the toner precipitate is subsequently heated to improve the light fastness thereof, that improvement comprising the addition prior to precipitation of 10–40%, with respect to said dyestuff, as an oxidizing agent, an aqueous solution of an inorganic salt containing a heavy metal to one of said solutions, said heavy metal forming a complex with said acid group of the dyestuff, whereby the deleterious effects of the heating step are avoided.

9. In a process for the manufacture of dyestuff toners wherein an acidic solution of a basic direct dyestuff having an acidic group and a basic group is precipitated with a solution of a polybasic acid of a heavy metal by reaction with said basic group, and the toner precipitate is subsequently heated to improve the light fastness thereof, that improvement comprising the addition prior to precipitation, of 10–40% with respect to said dyestuff, as an oxidizing agent, an aqueous solution of an inorganic salt containing a heavy metal to said solution of a polybasic acid, said heavy metal forming a complex with said acid group of the dyestuff, whereby deleterious effects of the heating step are avoided.

10. The process set forth in claim 9 wherein said oxidizing agent is a compound containing chromium.

11. The process set forth in claim 9 wherein said oxidizing agent is a compound containing vanadium.

12. The process set forth in claim 9 wherein said oxidizing agent is a compound containing manganese.

13. The process set forth in claim 9 wherein said oxidizing agent is a compound containing cerium.

14. The process set forth in claim 9 wherein said oxidizing agent is sodium dichromate.

15. In a process for the manufacture of dyestuff toners wherein an acidic solution of a basic direct dyestuff having an acidic group and a basic group is precipitated with a solution of a phospho-polybasic acid of a heavy metal by reaction with said basic group, and the toner precipitate is subsequently heated to improve the light fastness thereof, that improvement comprising the addition prior to precipitation of 10–40%, with respect to said dyestuff, as an oxidizing agent, an aqueous solution of an inorganic salt containing a heavy metal to one of said solutions, said heavy metal forming a complex with said acid group of the dyestuff, whereby deleterious effects of the heating step are avoided.

16. In a process for the manufacture of dyestuff toners wherein an acidic solution of a basic direct dyestuff having an acidic group and a basic group is precipitated with a solution of a phospho-polybasic acid of a heavy metal by reaction with said basic group, and the toner precipitate is subsequently heated to improve the light fastness thereof, that improvement comprising the addition prior to precipitation of 10–40% with respect to said dyestuff, as an oxidizing agent, an aqueous solution of an inorganic salt containing a heavy metal to said solution of a phospho-polybasic acid, said heavy metal forming a complex with said acid group of the dyestuff, whereby deleterious effects of the heating step are avoided.

17. A process for the manufacture of toners of basic dyes comprising the steps of introducing 10 parts of Rhodamine B into a solution consisting of 4 parts of glacial acetic acid, 34 parts of hydrochloric acid and 6000 parts of water, at 50 to 70° C., stirring said solution at 50 to 70° C. for 1 hour, introducing a fixing solution gradually over a period of ½ hour, said fixing solution comprising 15 parts anhydrous sodium molybdate, 3.4 parts disodium phosphate dodecahydrate, 23 parts sodium tungstate dihydrate and 2 parts sodium dichromate dihydrate, to 280 parts of water; subsequent to said addition, subjecting the resulting pigment slurry to boiling for a period of ½ to 1 hour.

ALFRED F. SCHMUTZLER.
DONALD F. OTHMER.

REFERENCES CITED

The following references are of record in the file of this patent:

UNITED STATES PATENTS

| Number | Name | Date |
|---|---|---|
| 1,378,882 | Linz | May 24, 1921 |
| 1,921,857 | Zschimmer et al. | Aug. 8, 1933 |
| 2,096,722 | Andersen | Oct. 26, 1937 |
| 2,195,258 | Pierce | Mar. 26, 1940 |

FOREIGN PATENTS

| Number | Country | Date |
|---|---|---|
| 65,282 | Germany | Oct. 19, 1892 |